(12) United States Patent
Kang et al.

(10) Patent No.: US 11,567,330 B2
(45) Date of Patent: *Jan. 31, 2023

(54) DISPLAY CONTROL APPARATUS, DISPLAY CONTROL METHOD, AND DISPLAY CONTROL PROGRAM

(71) Applicant: Sony Interactive Entertainment Inc., Tokyo (JP)

(72) Inventors: Mihee Kang, Tokyo (JP); Masashi Nakata, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,192

(22) Filed: Sep. 30, 2021

(65) Prior Publication Data

US 2022/0019084 A1 Jan. 20, 2022

Related U.S. Application Data

(63) Continuation of application No. 16/883,130, filed on May 26, 2020, now Pat. No. 11,181,744.

(30) Foreign Application Priority Data

Jun. 6, 2019 (JP) .............................. JP2019-106245

(51) Int. Cl.
*G02B 27/01* (2006.01)
*G06F 3/0338* (2013.01)

(52) U.S. Cl.
CPC ..... *G02B 27/0172* (2013.01); *G02B 27/0179* (2013.01); *G06F 3/0338* (2013.01);

(Continued)

(58) Field of Classification Search
CPC .... H04N 21/42222; G06F 3/011; G06F 3/012
See application file for complete search history.

(56) References Cited

U.S. PATENT DOCUMENTS

| | | | |
|---|---|---|---|
| 10,373,342 B1 * | 8/2019 | Perez, III | G06F 3/0346 |
| 2017/0336882 A1 * | 11/2017 | Tome | G06F 3/03547 |
| 2019/0149873 A1 * | 5/2019 | DiVerdi | H04N 21/816 |
| | | | 725/38 |

OTHER PUBLICATIONS

United States Office Action dated Apr. 28, 2021, from corresponding U.S. Appl. No. 16/883,130.

(Continued)

*Primary Examiner* — Roy P Rabindranath
(74) *Attorney, Agent, or Firm* — Katten Muchin Rosenman LLP

(57) ABSTRACT

Disclosed herein is a display control apparatus including an image producing part that produces an image of a virtual space to be displayed on a head-mounted display, a display control part that causes the head-mounted display to display thereon the image of the virtual space, and a position selecting part that accepts a selection instruction for a position in the virtual space displayed on the head-mounted display, through an input apparatus used by a user. When the position selecting part accepts the selection instruction for the position from the user, the position selecting part causes the head-mounted display to display thereon an image of the input apparatus, and accepts the selection instruction for the position from a plurality of selectable positions in accordance with an input position relative to a touch pad included in the input apparatus.

15 Claims, 11 Drawing Sheets

(52) U.S. Cl.
CPC ............... *G02B 2027/0123* (2013.01); *G02B 2027/0181* (2013.01)

(56) References Cited

OTHER PUBLICATIONS

United States Notice of Allowance dated Jul. 30, 2021, from corresponding U.S. Appl. No. 16/883,130.

* cited by examiner

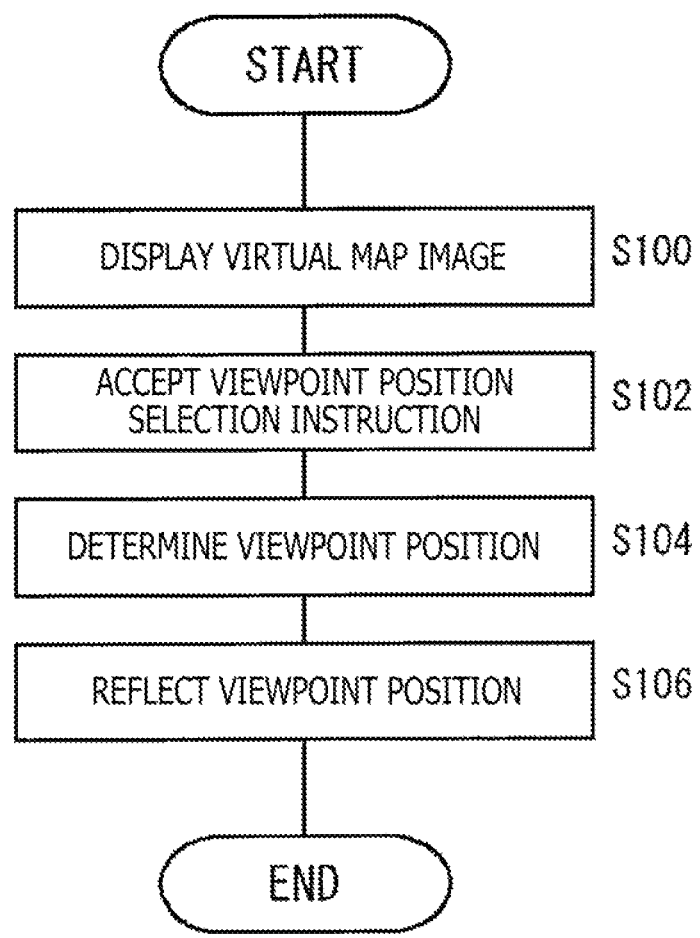

DISPLAY CONTROL APPARATUS, DISPLAY CONTROL METHOD, AND DISPLAY CONTROL PROGRAM

CROSS REFERENCE TO RELATED APPLICATIONS

This application claims the benefit of Japanese Priority Patent Application JP 2019-106245 filed Jun. 6, 2019, the entire contents of which are incorporated herein by reference.

BACKGROUND

The present disclosure relates to a display control technique and, in particular, to a display control apparatus, a display control method, and a display control program that each control display onto a head-mounted display.

A technique of displaying an image of a virtual space on a head-mounted display that is attached to the head of a user has been provided. In an ordinary stationary-type display, a range of a field of view of a user extends also to the outside of the screen of the display. As a result, the user may have difficulty in concentrating on a screen of the display, and a sense of immersion into a video may be insufficient, in some cases. In this regard, when a user wears the head-mounted display, the user consequently views only the video displayed on the head-mounted display, so that the sense of immersion into the world in the video can further be enhanced.

SUMMARY

The inventor of the present disclosure has recognized that a more convenient display control technique is necessary for allowing a larger number of users to enjoy a virtual reality using the head-mounted display.

A display control apparatus according to an embodiment of the present disclosure includes an image producing part that produces an image of a virtual space to be displayed on a head-mounted display, a display control part that causes the head-mounted display to display thereon the image of the virtual space, and a position selecting part that accepts a selection instruction for a position in the virtual space displayed on the head-mounted display, through an input apparatus used by a user. When the position selecting part accepts the selection instruction for the position from the user, the position selecting part causes the head-mounted display to display thereon an image of the input apparatus, and accepts the selection instruction for the position from a plurality of selectable positions in accordance with an input position relative to a touch pad included in the input apparatus.

Another embodiment of the present disclosure is a display control method. In this method, a display control apparatus produces an image of a virtual space to be displayed on a head-mounted display, causes the head-mounted display to display thereon the image of the virtual space, and accepts a selection instruction for a position in the virtual space displayed on the head-mounted display, through an input apparatus used by a user. When the selection instruction for the position is accepted from the user, the head-mounted display is caused to display thereon an image of the input apparatus, and the selection instruction for the position is accepted from a plurality of selectable positions in accordance with an input position relative to a touch pad included in the input apparatus.

In addition, those that are each formed by converting an optional combination of the above constituent elements and the expression of the present disclosure among a method, a device, a system, and the like are also valid as aspects of the present disclosure.

According to the present disclosure, the convenience of a head-mounted display for a user can be improved.

BRIEF DESCRIPTION OF THE DRAWINGS

FIG. 12 is a flowchart depicting a procedure for a display control method according to the embodiment.

DETAILED DESCRIPTION OF THE PREFERRED EMBODIMENT

In this embodiment, a user interface to accept from a user a selection instruction for a position in a virtual space displayed on a head-mounted display will be described. It is considered that a cross key, an analog stick, or the like that is included in an input apparatus used by a user is used to accept from the user the selection instruction for a position from a plurality of selectable positions. In this case, for example, the selection of the position is switched one by one in accordance with the order determined in advance for each input by the cross key or the analog stick, and the inputting therefore needs to be executed repeatedly for many times to select a position distant from the position that is currently selected. Moreover, in a case where the cross key is used, when the user desires to select another position in an oblique direction from the position being currently selected, it may be difficult to know which key should be input. In this embodiment, therefore, to enhance the convenience of the user interface, a touch pad included in the input apparatus is used, and the selection instruction for a position is accepted in accordance with the input position on the touch pad.

However, in a state where the user wears the head-mounted display, the user may not visually recognize directly the touch pad of the input apparatus. Accordingly, in a case where the user is not used to inputting onto the touch pad, it is difficult for the user to accurately and precisely touch a position on the touch pad that corresponds to a desired position, and a new problem arises that the user consequently needs to input for many times for correction. To solve such a new problem as above, in this embodiment, an operational feeling that causes the user to feel as if the user performed the inputting actually seeing the input apparatus gripped by the user is realized by displaying an image of the input apparatus on the head-mounted display. A user interface with which the position is easily selected can thereby be provided, and the convenience for the user can therefore be improved.

Figure 1:
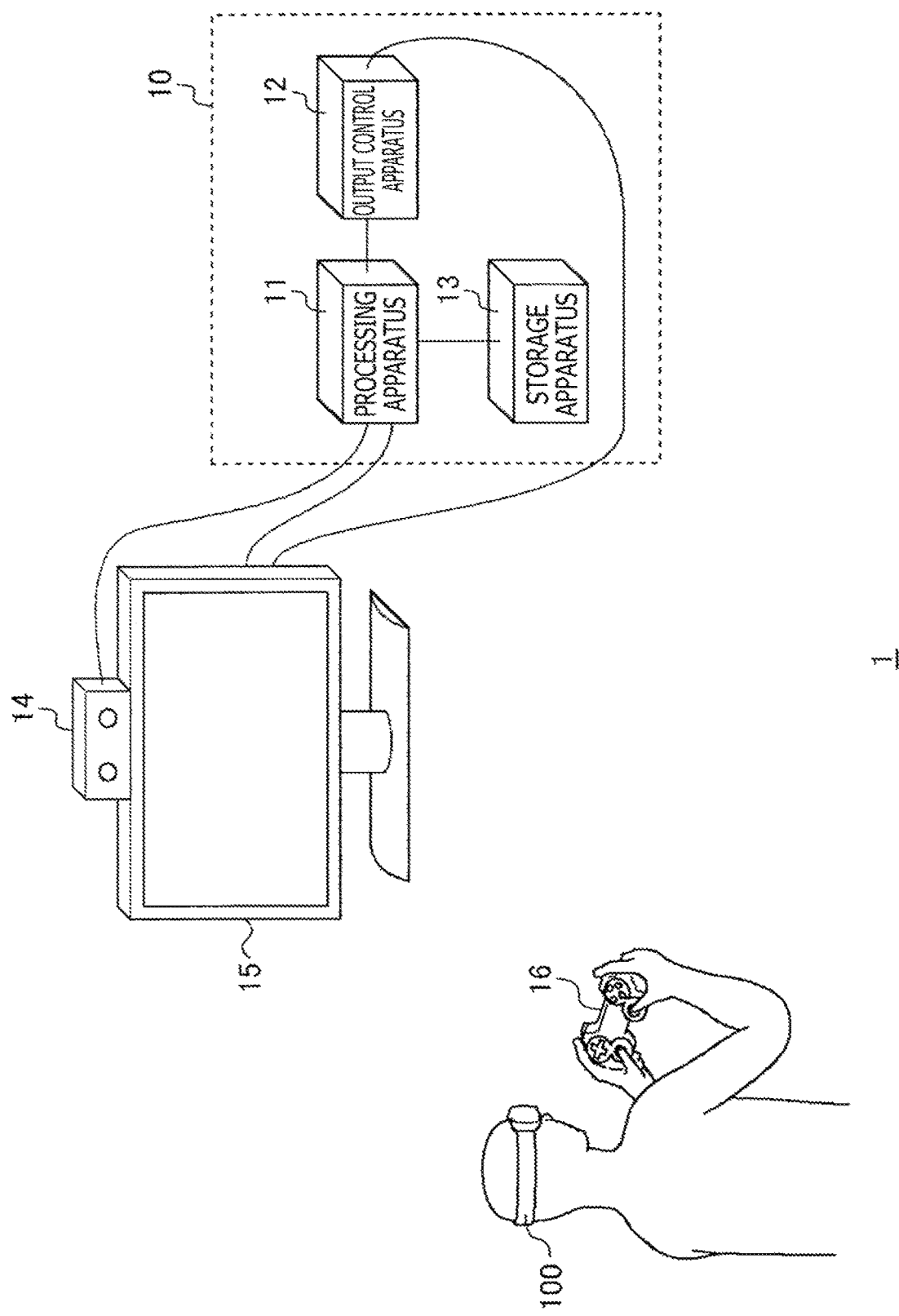
FIG. 1 is a diagram depicting a usage environment of a display control system according to an embodiment.

FIG. 1 depicts a usage environment of a display control system 1 according to the embodiment. The display control system 1 includes a display control apparatus 10 that executes a display control program, an input apparatus 16 to input an instruction by the user into the display control apparatus 10, an imaging apparatus 14 that images a real space on the periphery of the user, and a head-mounted display 100 that displays thereon an image of a virtual space produced by the display control apparatus 10.

The display control apparatus 10 executes the display control program on the basis of an instruction input by the input apparatus 16 or the head-mounted display 100, a position or a posture of the input apparatus 16 or the head-mounted display 100, or the like, produces an image of the virtual space, and transmits this image to the head-mounted display 100.

The head-mounted display 100 is a display apparatus that displays images on display panels thereof that are positioned in front of the eyes of the user, by being worn on the head of the user. The head-mounted display 100 displays an image for the left eye on a display panel for the left eye and an image for the right eye on a display panel for the right eye separately from each other. These images constitute parallax images acquired by seeing from the right and the left viewpoints, and realize a stereoscopic vision. In addition, the user views the display panels through each of optical lenses, and the display control apparatus 10 therefore supplies parallax image data whose optical strain caused by the lenses is corrected to the head-mounted display 100.

The head-mounted display 100 displays thereon the image of the virtual space that is produced by the display control apparatus 10. Moreover, the head-mounted display 100 transmits information relating to an input by the user onto the input apparatus included in the head-mounted display 100, to the display control apparatus 10. The head-mounted display 100 may be connected to the display control apparatus 10 by a wired cable, or may also be connected thereto wirelessly through a wireless local area network (LAN) or the like.

The input apparatus 16 has a function of transmitting an instruction input by the user to the display control apparatus 10. In this embodiment, the input apparatus 16 is configured as a wireless controller capable of executing wireless communication with the display control apparatus 10. The input apparatus 16 and the display control apparatus 10 may also establish wireless connection using a Bluetooth (registered trademark) protocol. In addition, the input apparatus 16 may not be limited to the wireless controller, but may also be a wired controller that is connected to the display control apparatus 10 through a cable. The input apparatus 16 is driven by a battery, and includes a plurality of buttons, a cross key, an analog stick, a touch pad, and the like to execute the instruction input for the display control apparatus 10. When the user operates the button or the like on the input apparatus 16, an instruction input by this operation is transmitted to the display control apparatus 10 by the wireless communication.

The imaging apparatus 14 is a video camera that includes a charge coupled device (CCD) imaging element, a complementary metal-oxide-semiconductor (CMOS) imaging element, or the like, images the real space at a predetermined cycle, and thereby produces a frame image for each cycle. The imaging apparatus 14 is connected to the display control apparatus 10 through a universal serial bus (USB) or another interface. The image captured by the imaging apparatus 14 is used to derive the positions and the postures of the input apparatus 16 and the head-mounted display 100 in the display control apparatus 10. The imaging apparatus 14 may also be a ranging camera capable of acquiring a distance or a stereo camera. In this case, the distance between the imaging apparatus 14, and the input apparatus 16, the head-mounted display 100, or the like can be acquired by the imaging apparatus 14.

In the display control system 1 of this embodiment, the input apparatus 16 and the head-mounted display 100 each include a light emitting part that is configured to be able to emit light in a plurality of colors. During the display of an image of the virtual space, the light emitting part emits light in a color instructed by the display control apparatus 10 and is imaged by the imaging apparatus 14. The imaging apparatus 14 images the input apparatus 16, produces a frame image, and supplies this image to the display control apparatus 10. The display control apparatus 10 acquires the frame image and derives position information regarding the light emitting part in the real space from the position and the size of the image of the light emitting part in the frame image. In a case where the display control apparatus 10 is a gaming apparatus that executes a game program and that causes the head-mounted display 100 to display thereon a game image, the display control apparatus 10 may handle the position information as an operation instruction for a game, and may cause the position information to be reflected on the processing for the game such as controlling a motion of a player's character.

Moreover, the input apparatus 16 and the head-mounted display 100 each include an acceleration sensor and a gyro sensor. Detection values detected by the sensors are transmitted to the display control apparatus 10 at a predetermined cycle, and the display control apparatus 10 acquires the detection values detected by the sensors and acquires a position information regarding the input apparatus 16 and the head-mounted display 100 in the real space. In a case where the display control apparatus 10 is a gaming apparatus, the display control apparatus 10 may handle the position information as an operation instruction for a game, and may cause the position information to be reflected on the processing for the game.

The display control apparatus 10 includes a processing apparatus 11, an output control apparatus 12, and a storage apparatus 13. The processing apparatus 11 accepts the operation information input by the user into the input apparatus 16, and produces an image to be displayed on the head-mounted display 100. The output control apparatus 12 outputs image data produced by the processing apparatus 11 to the head-mounted display 100. The storage apparatus 13 stores therein the display control program, data such as images of and shapes in the virtual space, and control parameters, that are used by the processing apparatus 11, and other various types of data.

The function achieved by the output control apparatus 12 may be incorporated in the processing apparatus 11. Specifically, the display control apparatus 10 may include one processing apparatus 11 or may include the processing apparatus 11 and the output control apparatus 12. In the following, the description will be given regarding the function of providing the image of the virtual space to the head-mounted display 100 collectively as the function of the display control apparatus 10.

The output apparatus 15 displays the image produced by the display control apparatus 10. The output apparatus 15 may be a television receiver that includes a display and a speaker, or may be a computer display. Because the user views the image using the head-mounted display 100, the user wearing the head-mounted display 100 does not need the output apparatus 15 while another user can view the display image of the output apparatus 15 by preparing the output apparatus 15. The output control apparatus 12 or the processing apparatus 11 may also cause the output apparatus 15 to display thereon the same image as the image that is currently viewed by the user wearing the head-mounted display 100, or may also cause the output apparatus 15 to display thereon another image. For example, in such a case that a user wearing the head-mounted display 100 and another user play a game together, a game image from the viewpoint of the character for the another user may be displayed on the output apparatus 15.

Figure 2:
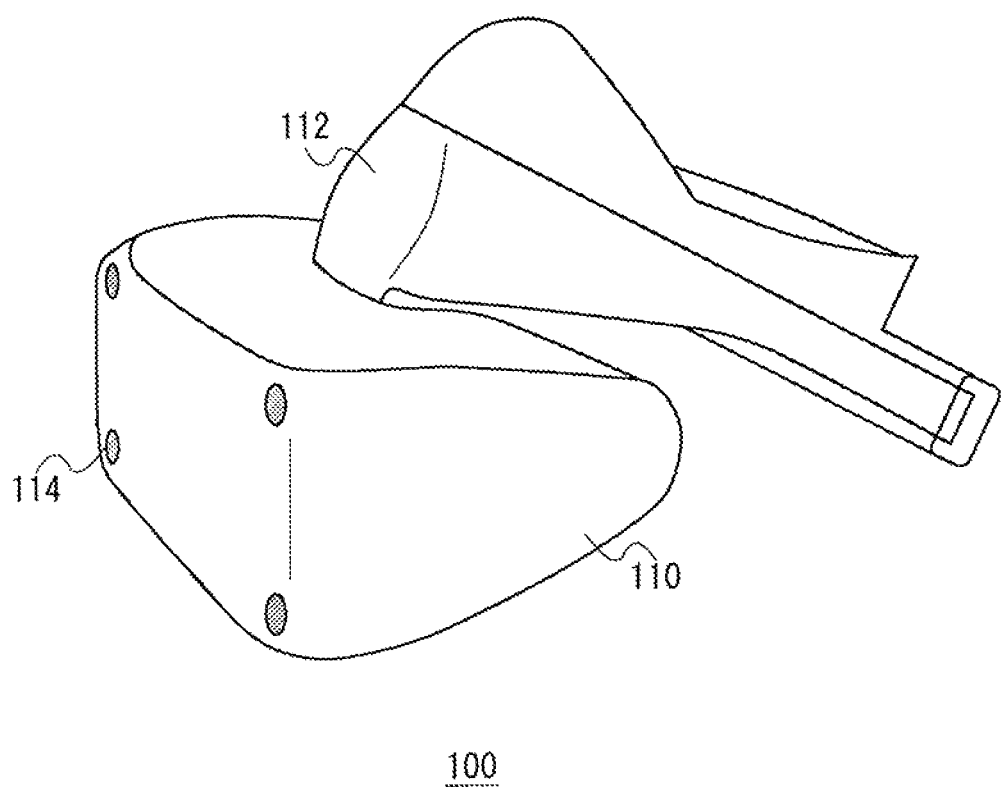
FIG. 2 is an outer appearance diagram of a head-mounted display according to the embodiment.

FIG. 2 is an outer appearance diagram of the head-mounted display 100 according to the embodiment. The head-mounted display 100 includes a main body part 110, a head contact part 112, and a light emitting part 114.

The main body part 110 includes a display, a global positioning system (GPS) unit to acquire the position information, a posture sensor, a communication apparatus, and the like. The head contact part 112 may include a biological information acquiring sensor capable of measuring the biological information of the user, such as the body temperature, the pulse, the blood components, the perspiration, the brain wave, and the cerebral blood flow. The light emitting part 114 emits light in a color instructed from the display control apparatus 10 as above and functions as a criterion for calculating the position of the head-mounted display 100 in the image captured by the imaging apparatus 14.

A camera that captures the eyes of the user may further be provided in the head-mounted display 100. The line of sight, a move of each of the pupils, a nictitation, and the like of the user can be detected by the camera mounted on the head-mounted display 100.

The head-mounted display 100 will be described in this embodiment while the display control technique of this embodiment is also applicable not only to the head-mounted display 100 in a narrow sense but also to a case where glasses, a glass-type display, a glass-type camera, headphones, a headset (headphones equipped with a microphone), earphones, earrings, an ear-hanging camera, a hat, a hat equipped with a camera, a hairband, or the like is worn.

Figure 3:
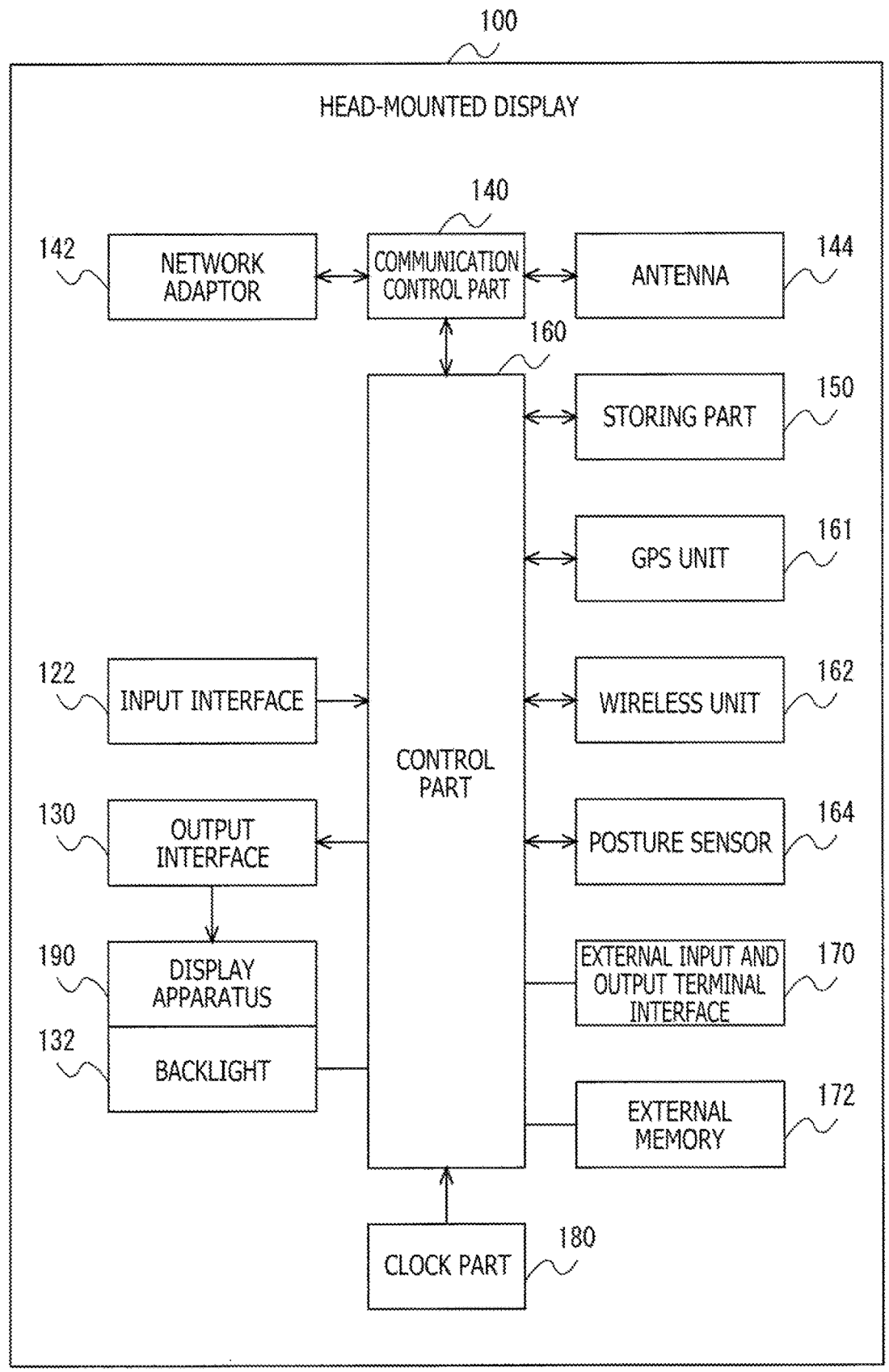
FIG. 3 is a functional configuration diagram of the head-mounted display.

FIG. 3 is a functional configuration diagram of the head-mounted display 100. The head-mounted display 100 includes an input interface 122, an output interface 130, a backlight 132, a communication control part 140, a network adaptor 142, an antenna 144, a storing part 150, a GPS unit 161, a wireless unit 162, a posture sensor 164, an external input and output terminal interface 170, an external memory 172, a clock part 180, a display apparatus 190, and a control part 160.

In FIG. 3, the elements described as the functional blocks that execute various processes can be configured by hardware such as a circuit block, a memory, and another large scale integrated circuit (LSI), or implemented by software such as a program loaded into the memory, or the like. Thus, it will be understood by those skilled in the art that these functional blocks may be variously implemented by hardware only, by software only, or by a combination of hardware and software. The functional blocks are not limited to any of these.

The control part 160 is a main processor that processes signals such as an image signal and a sensor signal, orders, and data to output the processing results. The input interface 122 accepts an operation signal and a setting signal from an input button and the like, and supplies these signals to the control part 160. The output interface 130 receives the image signal from the control part 160, and causes the display apparatus 190 to display thereon an image thereof. The backlight 132 supplies backlight to a liquid crystal display included in the display apparatus 190.

The communication control part 140 transmits data input thereinto from the control part 160 to the outside by wired or wireless communication through the network adaptor 142 or the antenna 144. Moreover, the communication control part 140 receives data from the outside by wired or wireless communication through the network adaptor 142 or the antenna 144 and outputs the received data to the control part 160.

The storing part 150 temporarily stores therein data, parameters, operation signals, and the like to be processed by the control part 160.

The GPS unit 161 receives the position information from a GPS satellite and supplies the position information to the control part 160 in accordance with operation signals from the control part 160. The wireless unit 162 receives the position information from a wireless base station and supplies the position information to the control part 160 in accordance with operation signals from the control part 160.

The posture sensor 164 detects the posture information regarding the orientation, the inclination, and the like of the main body part 110 of the head-mounted display 100. The posture sensor 164 is realized by appropriately using a gyro sensor, an acceleration sensor, an angular acceleration sensor, and the like in combination.

The external input and output terminal interface 170 is an interface to connect the peripheral devices such as a USB controller. The external memory 172 is an external memory such as a flash memory.

The clock part 180 sets time information using a setting signal from the control part 160, and supplies time data to the control part 160.

Figure 4A:
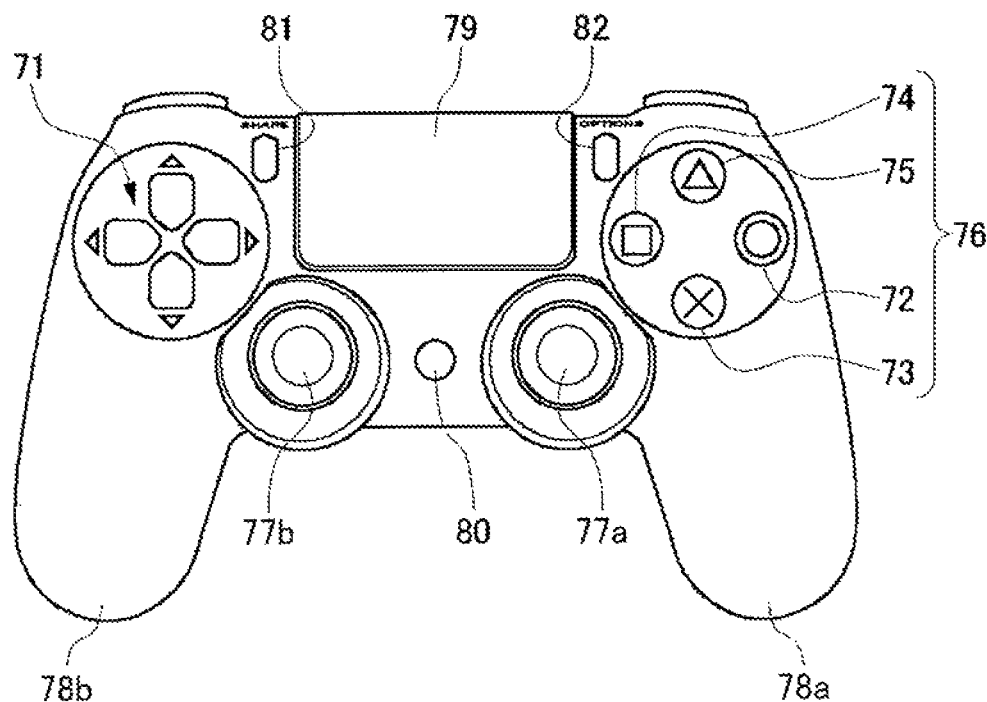
FIGS. 4A and 4B are outer appearance diagrams of an input apparatus.
Figure 4B:
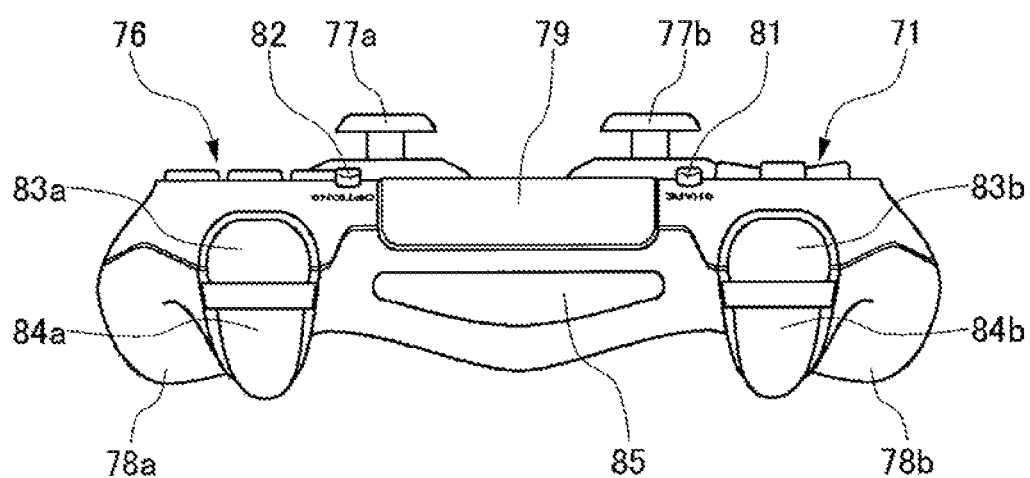

FIGS. 4A and 4B are outer appearance diagrams illustrating the input apparatus 16. FIG. 4A depicts an outer appearance configuration of an upper face of the input apparatus 16. The user operates the input apparatus 16 gripping a left-side grip portion 78b with the user's left hand and gripping a right-side grip portion 78a with the user's right hand. A direction key 71, analog sticks 77a and 77b, and four different operation buttons 76 which are input parts are provided on an upper face of a housing of the input apparatus 16. Four buttons 72 to 75 have different figures marked with different colors thereon in order to allow distinction thereof from one another. In other words, the circle button 72 is marked with a red round mark, the cross button 73 with a blue cross mark, the square button 74 with a purple square mark, and the triangular button 75 with a green triangle mark. On the upper face of the housing, a touch pad 79 is provided in a flat region between the direction key 71 and the operation buttons 76. The touch pad 79 also functions as a depression type button that is held down by being pressed by the user and moreover, that recovers to its original position when the user releases the user's hand therefrom.

A function button 80 is provided between the two analog sticks 77a and 77b. The function button 80 is used to turn on the power source of the input apparatus 16 and to concurrently set the communication function of connecting the input apparatus 16 and the display control apparatus 10, to be active. After the input apparatus 16 is connected to the display control apparatus 10, the function button 80 is also used to cause the display control apparatus 10 to display a menu screen.

A SHARE button 81 is provided between the touch pad 79 and the direction key 71. The SHARE button 81 is used to input an instruction from the user to an operating system (OS) or system software of the display control apparatus 10. Moreover, an OPTIONS button 82 is provided between the touch pad 79 and the operation buttons 76. The OPTIONS button 82 is used to input an instruction from the user to an application (the game) executed by the display control apparatus 10. The SHARE button 81 and the OPTIONS button 82 may be each formed as a push-type button.

FIG. 4B depicts the outer appearance configuration of a side face on the rear side of the input apparatus 16. The touch pad 79 extends from the upper face of the housing of the input apparatus 16 on the upper side of the side face on the rear side of the housing, and a light emitting part 85 that is laterally elongated is provided on the lower side of the side face on the rear side of the housing. The light emitting part 85 includes light-emitting diodes (LEDs) for red (R), green (G), and blue (B), and is lit in accordance with light emission color information transmitted from the display control apparatus 10.

On the side face on the rear side of the housing, an upper side button 83a, a lower side button 84a, an upper side button 83b, and a lower side button 84b are provided at positions in a leftwardly and rightwardly symmetrical relationship in a longitudinal direction. The upper side button 83a and the lower side button 84a are respectively operated by the forefinger and the middle finger of the user's right hand, and the upper side button 83b and the lower side button 84b are respectively operated by the forefinger and the middle finger of the user's left hand. As depicted, the light emitting part 85 is provided between a line of the upper side button 83a and the lower side button 84a on the right side and a line of the upper side button 83b and the lower side button 84b on the left side so as not to be concealed by the forefingers or the middle fingers that operate the buttons, and the imaging apparatus 14 can preferably image the light emitting part 85 that is lit. The upper side buttons 83 may be configured as push-type buttons and the lower side buttons 84 may be configured as trigger-type buttons that are supported for pivotal motion.

Figure 5:
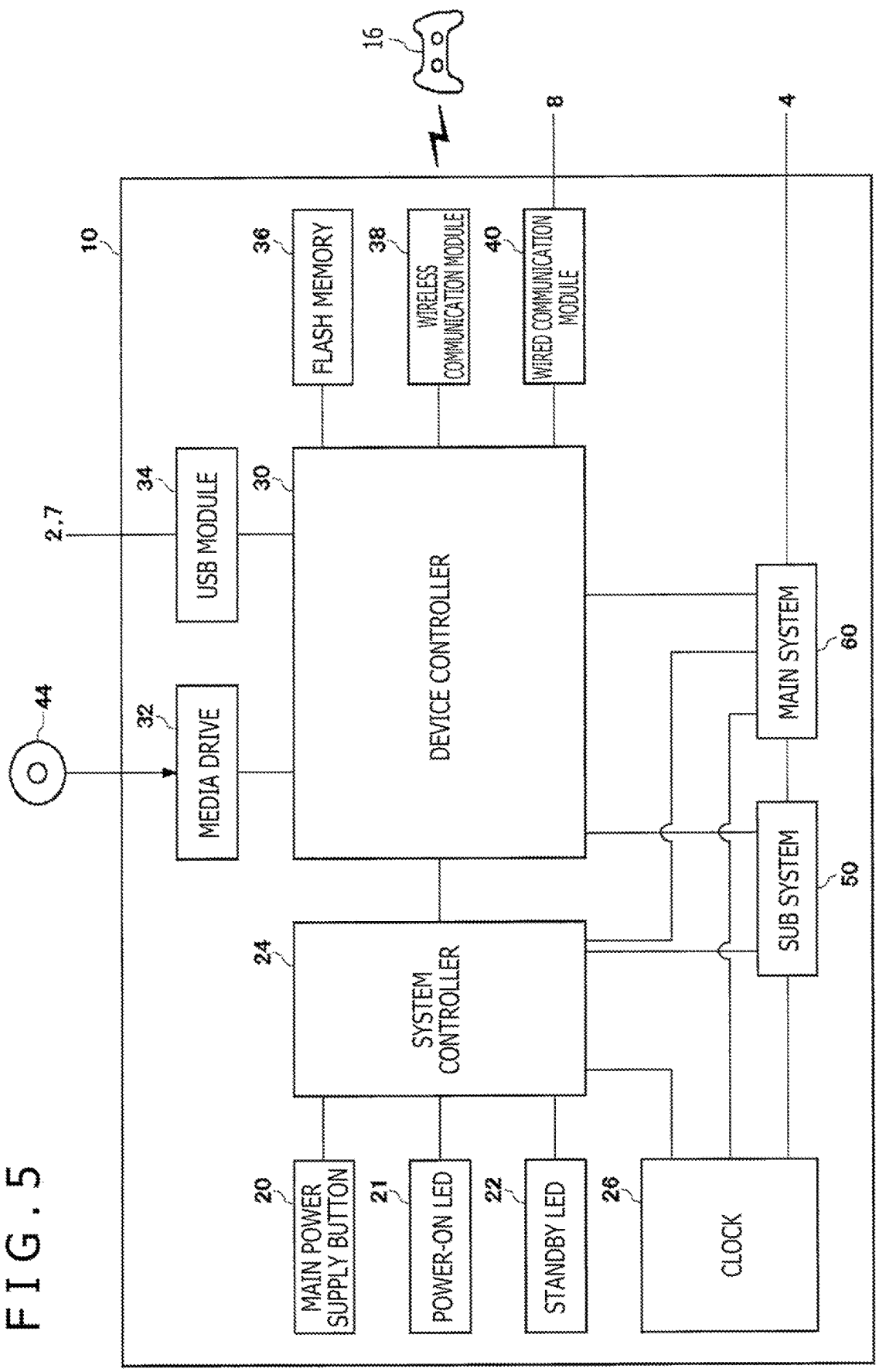
FIG. 5 is a diagram depicting a configuration of a display control apparatus.

FIG. 5 depicts the configuration of the display control apparatus 10. The display control apparatus 10 includes a main power supply button 20, a power-ON LED 21, a standby LED 22, a system controller 24, a clock 26, a device controller 30, a media drive 32, a USB module 34, a flash memory 36, a wireless communication module 38, a wired communication module 40, a sub system 50, and a main system 60. These configurations function as the processing apparatus 11, the output control apparatus 12, and the storage apparatus 13.

The main system 60 includes a main central processing unit (CPU), a memory and a memory controller that are a main storage apparatus, a graphics processing unit (GPU), and the like. The GPU is mainly used in a computing processes for the display control program. These functions may be configured as a system-on-chip and may be formed on one chip. The main CPU has a function of executing the display control program that is recorded in an auxiliary storage apparatus 2.

The sub system 50 includes a sub CPU, a memory and a memory controller that are a main storage apparatus, and the like, includes no GPU, and does not have a function of executing the display control program. The number of circuit gates of the sub CPU is smaller than the number of circuit gates of the main CPU, and the operation power consumption of the sub CPU is smaller than the operation power consumption of the main CPU. The sub CPU operates also while the main CPU is in a standby state and is limited in processing function thereof so as to suppress the power consumption low.

The main power supply button 20 is an input part through which an operational input from the user is executed, is provided on the front face of the housing of the display control apparatus 10, and is operated to turn on or off the power supply to the main system 60 of the display control apparatus 10. The power-ON LED 21 is lit when the main power supply button 20 is turned on, and the standby LED 22 is lit when the main power supply button 20 is turned off.

The system controller 24 detects depression of the main power supply button 20 by the user. In a case where the main power supply is turned off, when the main power supply button 20 is depressed, the system controller 24 acquires this depression operation as an "on-instruction." In contrast, in a case where the main power supply is turned on, when the main power supply button 20 is depressed, the system controller 24 acquires this depression operation as an "off-instruction."

The clock 26 is a real-time clock, produces date and time information at present, and supplies this information to the system controller 24, the sub system 50, and the main system 60.

The device controller 30 is configured as an LSI that executes delivery and reception of information between devices like a southbridge. As depicted, such devices are connected to the device controller 30 as the system controller 24, the media drive 32, the USB module 34, the flash memory 36, the wireless communication module 38, the wired communication module 40, the sub system 50, and the main system 60. The device controller 30 absorbs a difference in electric property and a difference in data transfer speed between the devices, and controls the timing for data transfer.

The media drive 32 is a drive apparatus which operates a read only memory (ROM) medium 44, on which application software of a game or the like and license information are recorded, loaded thereon to read out a program, data, and so forth from the ROM medium 44. The ROM medium 44 is a read-only recording medium such as an optical disc, a magneto-optical disc or a Blu-ray disc.

The USB module 34 is a module that is connected to an external device using a USB cable. The USB module 34 may be connected to the auxiliary storage apparatus and the imaging apparatus 14 using a USB cable. The flash memory 36 is an auxiliary storage apparatus that constitutes an internal storage. The wireless communication module 38 communicates by wireless with, for example, the input apparatus 16 in accordance with a communication protocol such as the Bluetooth (registered trademark) protocol or the Institute of Electrical and Electronics Engineers (IEEE) 802.11 protocol. In addition, the wireless communication module 38 may support the 3rd Generation digital mobile phone system complying with the International Mobile Telecommunication 2000 (IMT-2000) prescribed by the International Telecommunication Union (ITU) or, furthermore, may support another generation digital mobile phone system. The wired communication module 40 communicates with an external device by wire and is connected to an external network through, for example, an AP 8.

Figure 6:
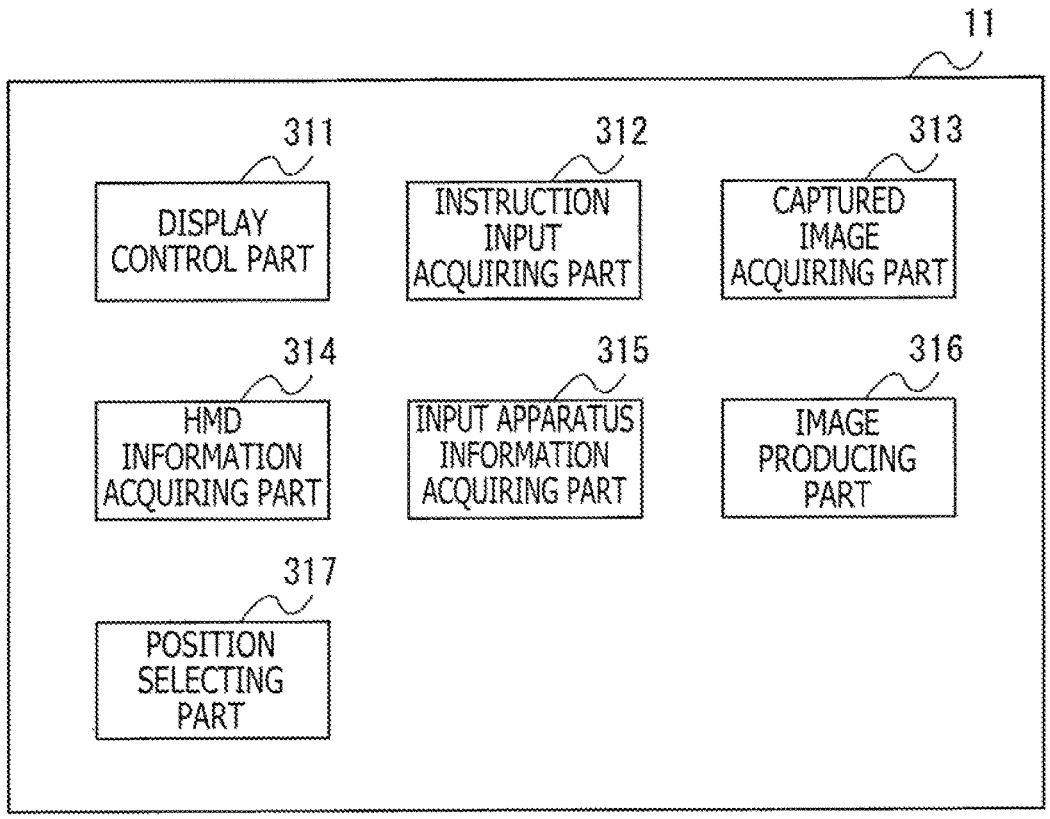
FIG. 6 is a functional configuration diagram of the display control apparatus.

FIG. 6 is a functional configuration diagram of the display control apparatus 10. The processing apparatus 11 of the display control apparatus 10 includes a display control part 311, an instruction input acquiring part 312, a captured image acquiring part 313, an HMD information acquiring part 314, an input apparatus information acquiring part 315, an image producing part 316, and a position selecting part 317. These functional blocks can also be realized in various forms by only hardware, only software, or a combination of these.

The instruction input acquiring part 312 acquires information relating to the instruction input by the user accepted by the input apparatus 16 or the head-mounted display 100, from the input apparatus 16 or the head-mounted display 100.

The captured image acquiring part 313 acquires an image captured by the imaging apparatus 14, analyses the acquired image, and calculates the positions and the postures of the input apparatus 16 and the head-mounted display 100. The captured image acquiring part 313 acquires frame images at a predetermined imaging speed (such as, for example, 30 frames/second) from the imaging apparatus 14, extracts the images of the light emitting parts of the input apparatus 16 and the head-mounted display 100 from the frame images, and identifies the position and the size of each of the images of the light emitting parts in the frame images. For example, the captured image acquiring part 313 identifies coordinates of the center of gravity and the radius of the image of a light emitting body in the frame image. The user causes the light emitting part to be lit in a color that is not likely to be used in the environment in which the display control system 1 is used, and thereby the image of the light emitting part can be highly precisely extracted from the frame image.

The captured image acquiring part 313 derives position information regarding the input apparatus 16 and the head-mounted display 100 that are seen from the imaging apparatus 14, from a position and a size of the image of the identified light emitting body. The captured image acquiring part 313 derives positional coordinates of camera coordinates, from the coordinates of the center of gravity of the image of the light emitting body and, moreover, derives distance information regarding a distance from the imaging apparatus 14, from the radius of the image of the light emitting body. These position coordinates and the distance information constitute the position information regarding the input apparatus 16 and the head-mounted display 100.

The HMD information acquiring part 314 acquires information relating to the posture of the head-mounted display 100 from the head-mounted display 100. Moreover, the HMD information acquiring part 314 acquires information relating to the position of the head-mounted display 100 from the captured image acquiring part 313. These pieces of information are delivered to the image producing part 316. The information relating to the posture of the head-mounted display 100 may be acquired by the captured image acquiring part 313 analyzing the captured images of the head-mounted display 100.

The input apparatus information acquiring part 315 acquires information relating to the posture of the input apparatus 16 from the input apparatus 16. Moreover, the input apparatus information acquiring part 315 acquires information relating to the position of the input apparatus 16 from the captured image acquiring part 313. These pieces of information are delivered to the image producing part 316 or the position selecting part 317. The information relating to the posture of the input apparatus 16 may be acquired by the captured image acquiring part 313 analyzing the captured images of the input apparatus 16.

In a case where the input apparatus 16 is not imaged by the imaging apparatus 14 as a result of coming out of the imaging range of the imaging apparatus 14 or being concealed by the body of the user, an obstacle, or the like, the input apparatus information acquiring part 315 calculates the position of the input apparatus 16 on the basis of the position of the input apparatus 16 acquired in the previous session and information relating to the posture of the input apparatus 16 acquired thereafter. For example, the input apparatus information acquiring part 315 may calculate the present position of the input apparatus 16 by calculating a shift from the position of the input apparatus 16 acquired in the previous session on the basis of the data regarding translational acceleration acquired from the acceleration sensor of the input apparatus 16. During the time period in which the input apparatus 16 is not imaged by the imaging apparatus 14, the position of the input apparatus 16 is similarly calculated sequentially. In a case where the input apparatus 16 is again imaged by the imaging apparatus 14, the position of the input apparatus 16 sequentially calculated using acceleration data may not indicate the accurate position by accumulation of drift errors, and therefore the position of the input apparatus 16 that is newly calculated by the captured image acquiring part 313 may be taken as the present position of the input apparatus 16. The same is applied to the head-mounted display 100.

The image producing part 316 produces an image of the virtual space to be displayed on the head-mounted display 100. The image producing part 316 sets a viewpoint position on the basis of the selection instruction for the position by the user accepted by the position selecting part 317 described later, sets a direction of a line of sight on the basis of the posture of the head-mounted display 100, and thereby produces an image of the virtual space. The image producing part 316 correlates the posture of the head-mounted display 100 and the direction of the line of sight in the virtual space at a predetermined timing, and thereafter changes the direction of the line of sight associated with change of the posture of the head-mounted display 100. The user can thereby look around in the virtual space by actually moving the head thereof, and can therefore have an experience that causes the user to feel as if the user were actually present in the virtual space. The image producing part 316 may produce an image of the virtual space from videos captured by imaging apparatuses that are installed at a plurality of positions in the real space, or may produce an image of the virtual space by rendering shape data regarding a virtual three-dimensional space. The image producing part 316 produces a display screen by adding information relating to the virtual space, an image to be displayed on the head-mounted display 100, and the like to the image of the produced virtual space.

The display control part 311 transmits the display screen produced by the image producing part 316 to the head-mounted display 100 through the wireless communication module 38 or the wired communication module 40, and causes the head-mounted display 100 to display thereon the display screen.

The position selecting part 317 accepts the selection instruction for the viewpoint position in the virtual space displayed on the head-mounted display 100, through the touch pad 79 of the input apparatus 16 used by the user.

When the position selecting part 317 accepts the selection instruction for the position from the user, the position selecting part 317 causes the head-mounted display 100 to display thereon the image of the input apparatus 16, and accepts the selection instruction of the viewpoint position from a plurality of selectable viewpoint positions in accordance with an input position relative to the touch pad 79 included in the input apparatus 16.

Figure 7:
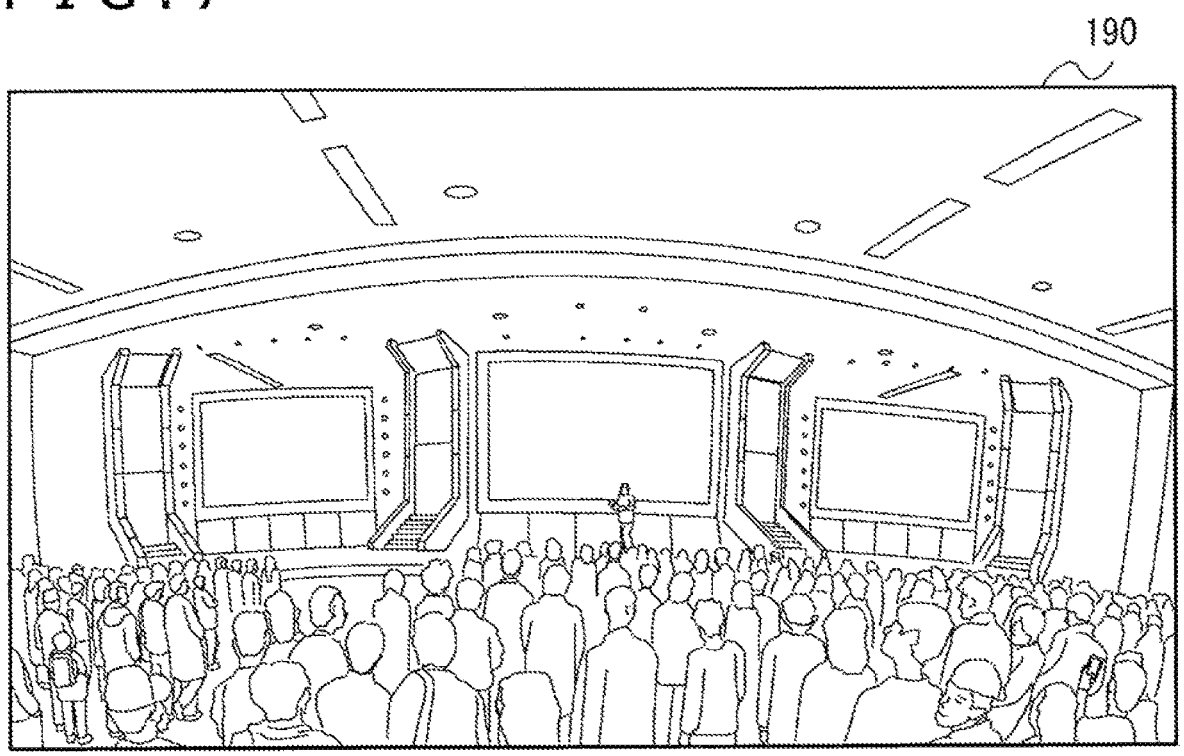
FIG. 7 is a diagram depicting an example of a display screen displayed on the head-mounted display.

FIG. 7 depicts an example of the display screen displayed on the head-mounted display 100. In the example in FIG. 7, a video captured by one of imaging apparatuses arranged at a plurality of positions on a site of a lecture meeting is displayed on the head-mounted display 100. This video is captured in the real world while this video is an example of an image of the virtual space in point of the fact that this video is not a video of the real world that is actually present in front of the user currently viewing this video.

Figure 8:
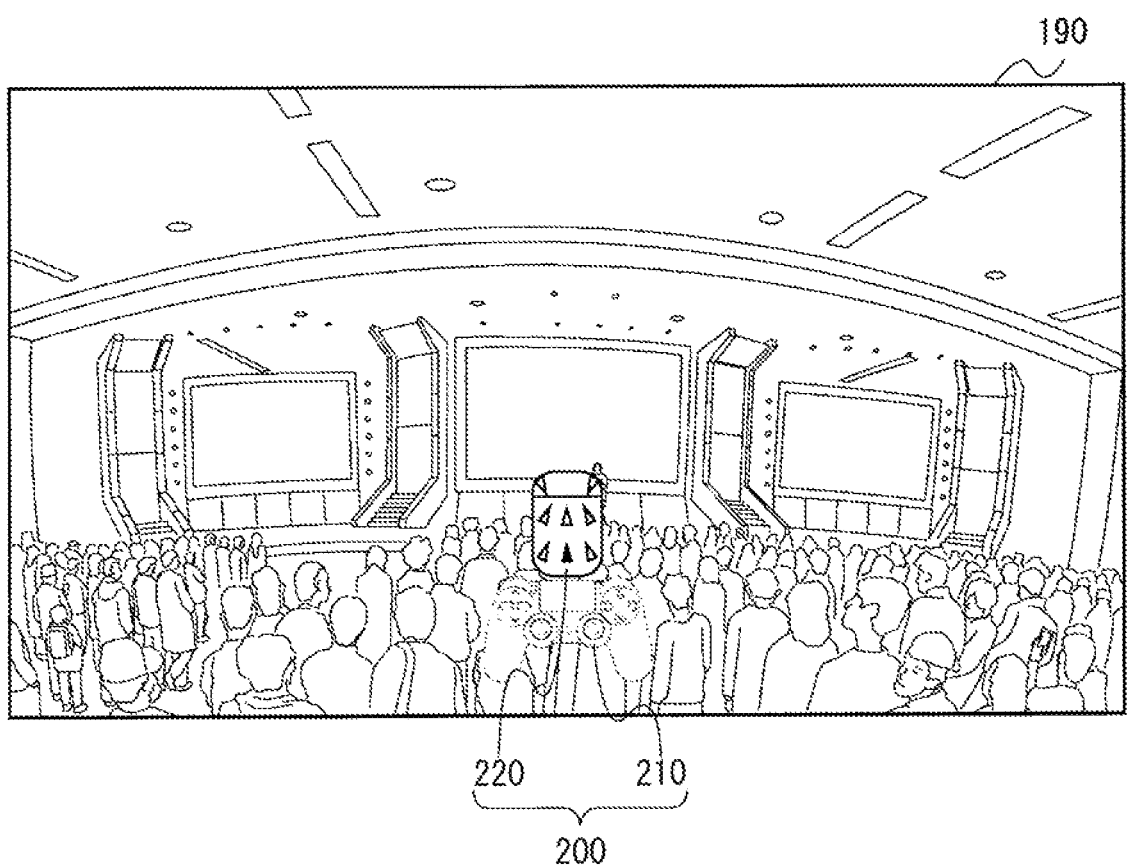
FIG. 8 is a diagram depicting an example of the display screen displayed on the head-mounted display.

FIG. 8 depicts an example of the display screen displayed on the head-mounted display 100. When the user depresses the triangular button 75 or the touch pad 79 of the input apparatus 16, the position selecting part 317 displays a position selection instruction acceptance screen 200 that includes an image 210 of the input apparatus 16 and an image of the virtual space including the plurality of selectable viewpoint positions (hereinafter, also referred to as a "virtual map image 220") on the head-mounted display 100, and accepts a selection instruction for the viewpoint position through the touch pad 79 of the input apparatus 16.

Figure 9:
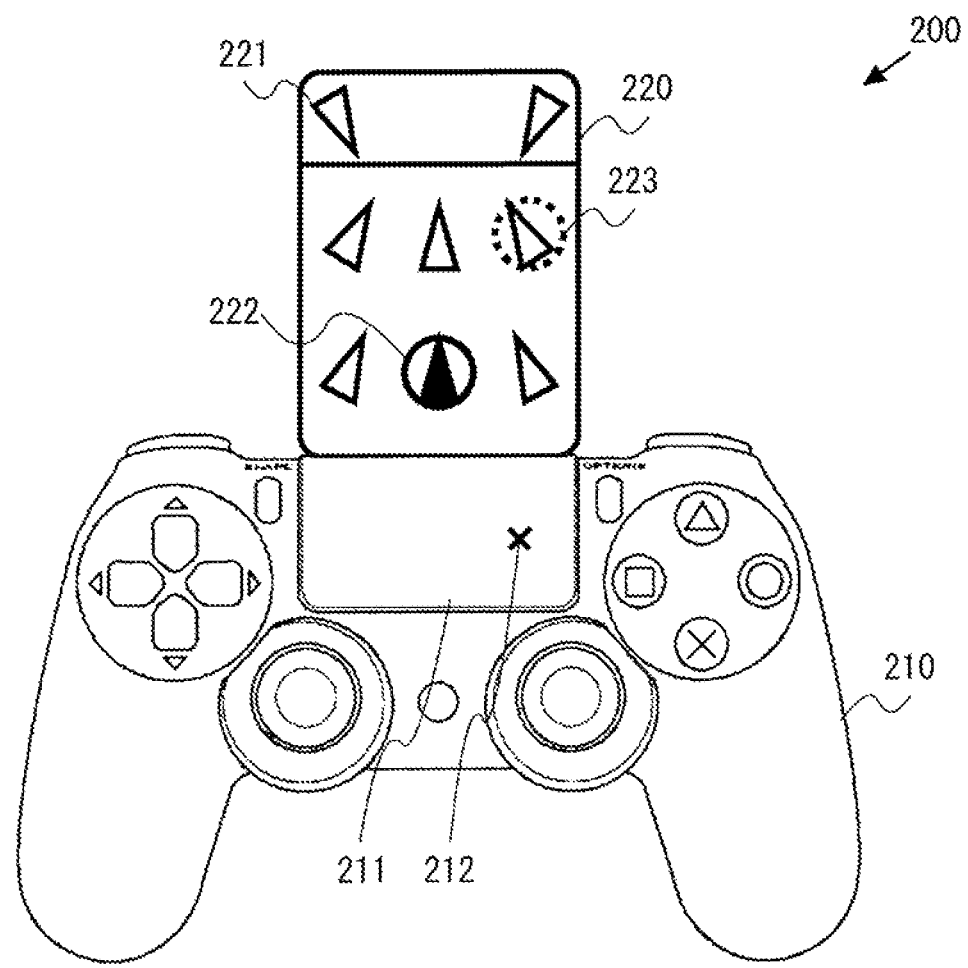
FIG. 9 is an enlarged diagram of a position selection instruction acceptance screen depicted in FIG. 8.

FIG. 9 is an enlarged diagram of the position selection instruction acceptance screen 200 depicted in FIG. 8. The position selecting part 317 displays the image 210 of the input apparatus 16 on the head-mounted display 100 on the basis of the relative positions of the input apparatus 16 and the head-mounted display 100. Moreover, the position selecting part 317 changes the posture of the image 210 of the input apparatus displayed on the head-mounted display 100 matching with the posture of the input apparatus 16. The user wearing the head-mounted display 100 may not visually recognize the input apparatus 16 in the real world. However, by displaying the image 210 of the input apparatus 16 at the position at which the input apparatus 16 is to be viewed by the user when the user does not wear the head-mounted display 100, the user can easily perform input onto the touch pad 79 of the input apparatus 16.

The position selecting part 317 displays the virtual map image 220 that includes the plurality of selectable viewpoint positions, superimposing this image on a touch pad 211 in the image 210 of the input apparatus 16 displayed on the head-mounted display 100 or in the vicinity of the touch pad 211. This virtual map image 220 may be a planar view image acquired by seeing the virtual space from a predetermined direction, or may be an image acquired by setting a predetermined viewpoint position and a predetermined direction of the line of sight, and thereby rendering the virtual space. In the example in FIG. 9, the planar view image acquired by seeing the virtual space from above is displayed as the virtual map image 220.

The position selecting part 317 displays a marker 221 indicating the plurality of selectable viewpoint positions, a marker 222 indicating the viewpoint position currently set, and a marker 223 indicating the viewpoint position currently selected.

The position selecting part 317 displays a pointer 212 indicating an input position relative to the touch pad 79 at a position that corresponds to the touch pad 211 in the image 210 of the input apparatus 16 displayed on the head-mounted display 100.

When the user depresses the circle button 72 or the touch pad 79, the position selecting part 317 determines the currently selected viewpoint position and notifies the image producing part 316 of this position. The image producing part 316 newly sets the viewpoint position notified of from the position selecting part 317 and thereby produces an image of the virtual space acquired by seeing the virtual space from the new viewpoint position. Before determining the viewpoint position, the position selecting part 317 may also display a preview image of the virtual space acquired by seeing the virtual space from the viewpoint position currently selected, in the vicinity of the image 210 of the input apparatus 16. When the position selecting part 317 determines the viewpoint position, the position selecting part 317 may also cause the input apparatus 16 to vibrate.

The user can select the viewpoint position visually recognizing the input position relative to the touch pad 79 by providing such a user interface as above, and the convenience for the user can therefore be improved. Even in a case where the user touches a position different from the position on the touch pad 79 that corresponds to a desired viewpoint position, the user can easily select the desired viewpoint position by referring to the pointer 212 indicating the input position and the marker 223 indicating the selected viewpoint position, sliding the finger toward the position that corresponds to the desired viewpoint position, and thereby tracing on the touch pad 79. The image 210 of the input apparatus 16 and the virtual map image 220 are displayed at positions at hand of the user, and the image of the virtual space currently viewed is not obstructed and the user can change the viewpoint continuing the viewing.

The plurality of selectable viewpoint positions is discretely provided in the example of this embodiment while the technique of this embodiment is also applicable to a case where the viewpoint position can continuously be varied. According to the technique of this embodiment, even in a case where many discrete viewpoint positions are prepared, or even in a case where the viewpoint position can continuously be varied, the selection instruction for the viewpoint position can easily be accepted without causing the user interface for accepting the selection instruction to be more complicated.

The position selecting part 317 may classify the plurality of selectable viewpoint positions into a plurality of groups and may accept the selection instruction for the viewpoint position from the viewpoint positions that belong to a group in accordance with an inputting mode onto the touch pad 79. For example, the plurality of viewpoint positions depicted in FIG. 9 may be classified into a group of the viewpoint positions on the side of the audience seats and a group of the viewpoint positions on the stage, one group may be selected therefrom in accordance with the kind of the finger that inputs onto the touch pad 79, the number thereof, and the like, and a selection instruction for the viewpoint position may be accepted in accordance with the input position from the viewpoint positions that belong to the selected group. The position selecting part 317 may refer to the captured image acquired by the captured image acquiring part 313 and may thereby decide the inputting mode onto the touch pad 79. For example, the position selecting part 317 refers to the captured image, and then determines the kind of the finger that inputs onto the touch pad 79 and the number thereof. The position selecting part 317 may cause the viewpoint positions on the side of the audience seats to be selectable in a case where the inputting is executed by a finger of the right hand, while causing the viewpoint positions on the stage to be selectable in a case where the inputting is executed by a finger of the left hand. The position selecting part 317 may cause the viewpoint positions on the side of the audience seats to be selectable in a case where the inputting is executed by a forefinger, while causing the viewpoint positions on the stage to be selectable in a case where the inputting is executed by a middle finger. The position selecting part 317 may cause the viewpoint positions on the side of the audience seats to be selectable in a case where the inputting is executed by one finger, while causing the viewpoint positions on the stage to be selectable in a case where the inputting is executed by two fingers. In a case where the touch pad 79 is an electrostatic capacitance touch pad capable of detecting change of the electrostatic capacitance, the position selecting part 317 may decide the inputting mode onto the touch pad 79 on the basis of the change of the electrostatic capacitance detected by the touch pad 79. Also in this case, the mode such as the kind, the number, or the like of the finger, the nail, or the like used for inputting onto the touch pad 79 can also be decided, and the group of the viewpoint positions can therefore be selected in accordance with the result of the decision.

The position selecting part 317 may divide the virtual space into a plurality of regions, and may switch the region in accordance with the inputting mode onto the touch pad 79. For example, the user may scroll the region using a swipe operation executed by two fingers, a swipe operation executed pushing down both sides of the touch pad 79, or the like. Alternatively, the user may scroll the region according to change of the line of sight of the user, an operation by the direction key 71 or the analog sticks 77 of the input apparatus 16, or the like. Moreover, in a case where lectures, performances, and the like on a plurality of sites can be viewed, the user may scroll the region on the same one site by a swipe operation in the up-and-down direction and may switch the site to another site by a swipe operation in the right-and-left direction.

The position selecting part 317 may accept an selection instruction for a position by the direction key 71 or the analog stick 77 included in the input apparatus 16. The convenience for the user can further be improved by enabling the viewpoint positions the to be selected using not only the touch pad 79 but also the direction key 71, the analog stick 77, and the like.

The position selecting part 317 may accept the selection instruction for the position from a terminal apparatus used by the user, or the like. In this case, the position selecting part 317 receives from the terminal apparatus an operation input by the user accepted through the touch pad by the terminal apparatus capable of communicating with the display control apparatus 10. When the position selecting part 317 accepts an operation of, for example, tracing on the touch pad with a finger so as to swirl, the position selecting part 317 may display the position selection instruction acceptance screen 200 on the head-mounted display 100 and may accept the selection instruction for the viewpoint position in accordance with the input position relative to the touch pad.

The user interface to accept the selection instruction for the viewpoint position used when the image of the virtual space is produced, from the user, has been described in the above example while the technique of this embodiment is also applicable to a case where a selection instruction for an optional position such as a position to arrange or move a character, an object, or the like in the virtual space is accepted from the user.

The planar view image of the overall virtual space is displayed as the virtual map image 220 in the position selection instruction acceptance screen 200 in the example depicted in FIG. 8 and FIG. 9, while the position selecting part 317 may display an image of a region of a portion of the virtual space and may accept a selection instruction for a position that is included in the region of the virtual space currently being displayed. For example, the position selecting part 317 may display the image of a region of a portion of the game field as the virtual map image 220 and may accept a selection instruction for the position to be a move destination for a character or the like operated by the user, in the region displayed as the virtual map image 220. In this case, the position selecting part 317 may be able to change the region of the game field to be displayed in accordance with an instruction from the user, the progress status of the game, or the like. The instruction to change the game field to be displayed may be accepted by the direction key 71, the analog stick 77, the touch pad 79, or the like of the input apparatus 16.

Figure 10A:
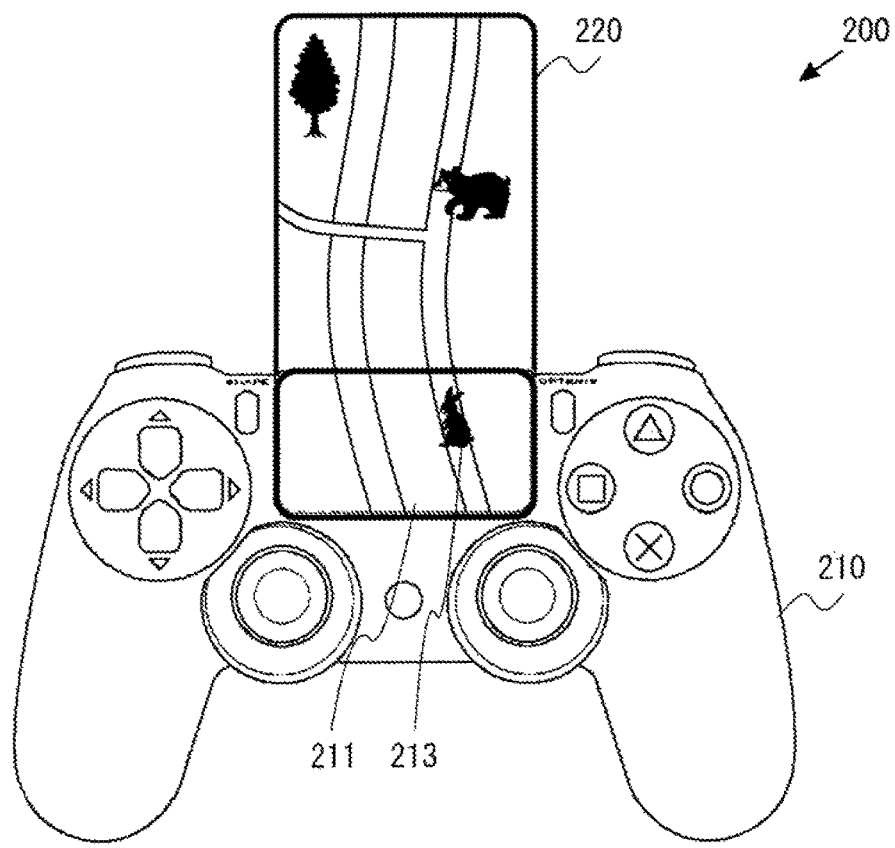
FIGS. 10A and 10B are diagrams illustrating other examples of the position selection instruction acceptance screen.
Figure 10B:
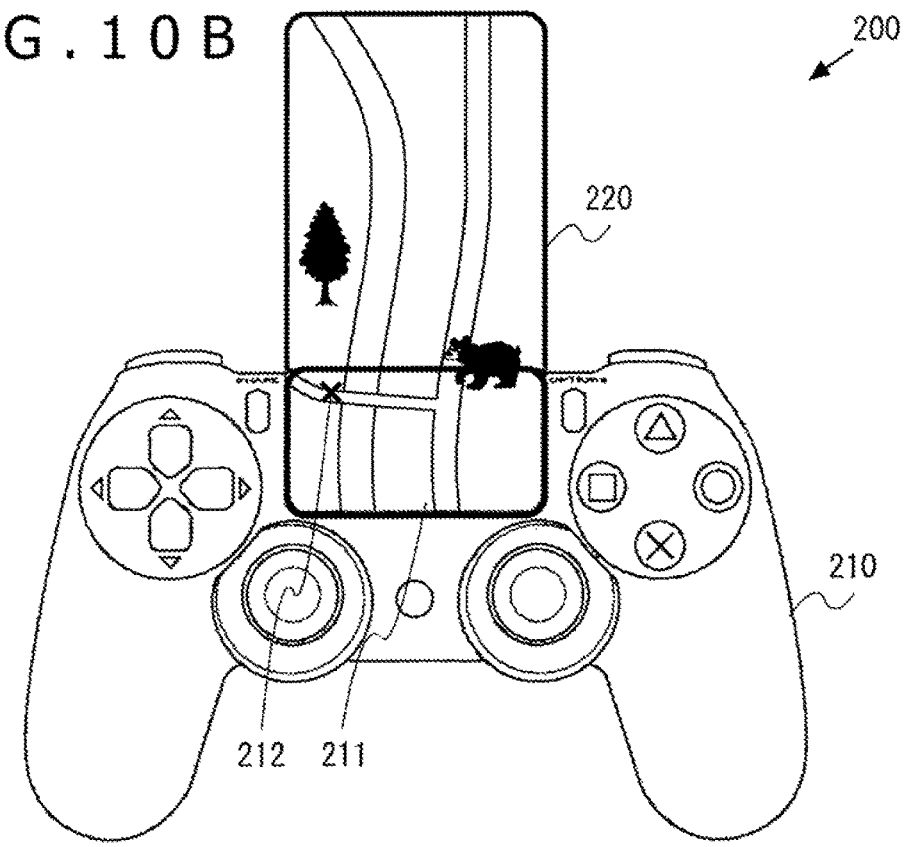

FIGS. 10A and 10B depict other examples of the position selection instruction acceptance screen 200. In the example depicted in FIG. 10A, a region in the vicinity of the present position of a character 213 operated by the user, of the game field, is displayed as the virtual map image 220. The position selecting part 317 displays an image of at least a portion of the game field and the image 210 of the input apparatus in a superimposed manner, and accepts a selection instruction for a position included in the region of the game field displayed being superimposed on the touch pad 211 of the image 210 of the input apparatus. In other words, the position selecting part 317 accepts the selection instruction for the position in the game field displayed at the position of the touch pad 211 that corresponds to the input position relative to the touch pad 79. The game control part that executes the game program moves the character 213 to the position in the game field accepted by the position selecting part 317. As depicted in FIG. 10B, the user can optionally select the position to be the move destination for the character 213 changing the region of the game field displayed being superimposed on the touch pad 211 by scrolling the region of the game field displayed as the virtual map image 220.

Figure 11A:
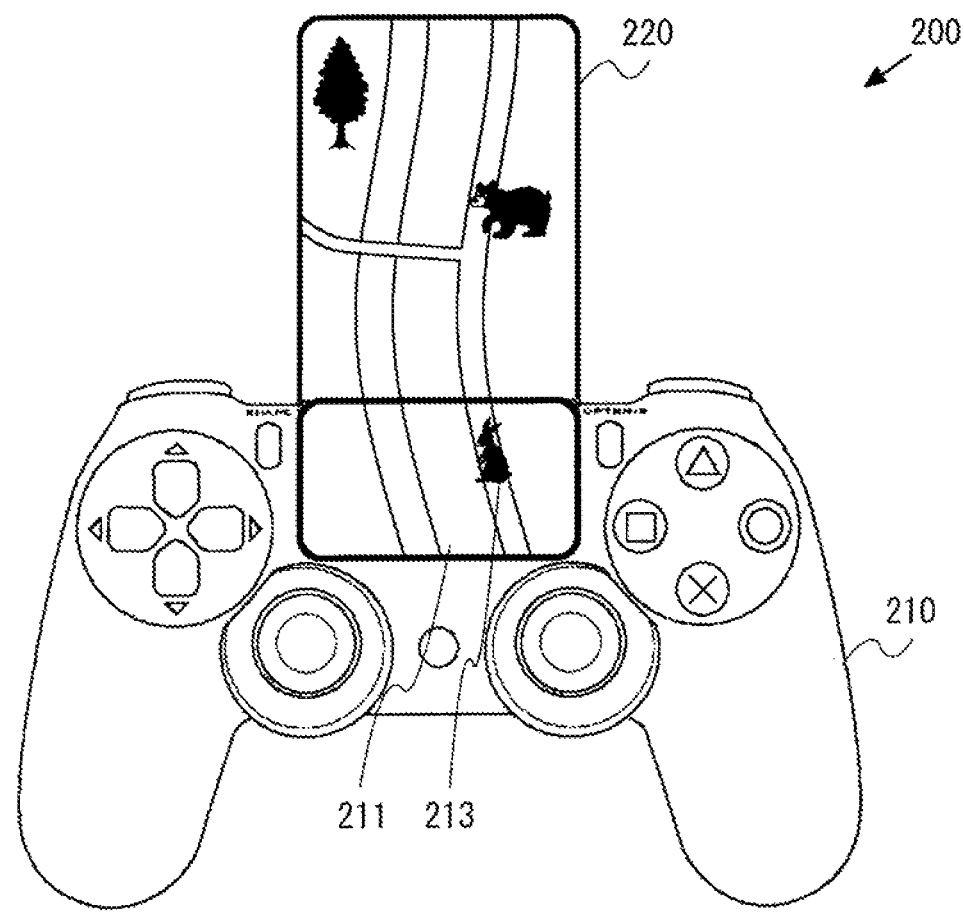
FIGS. 11A and 11B are diagrams illustrating other examples of the position selection instruction acceptance screen.
Figure 11B:
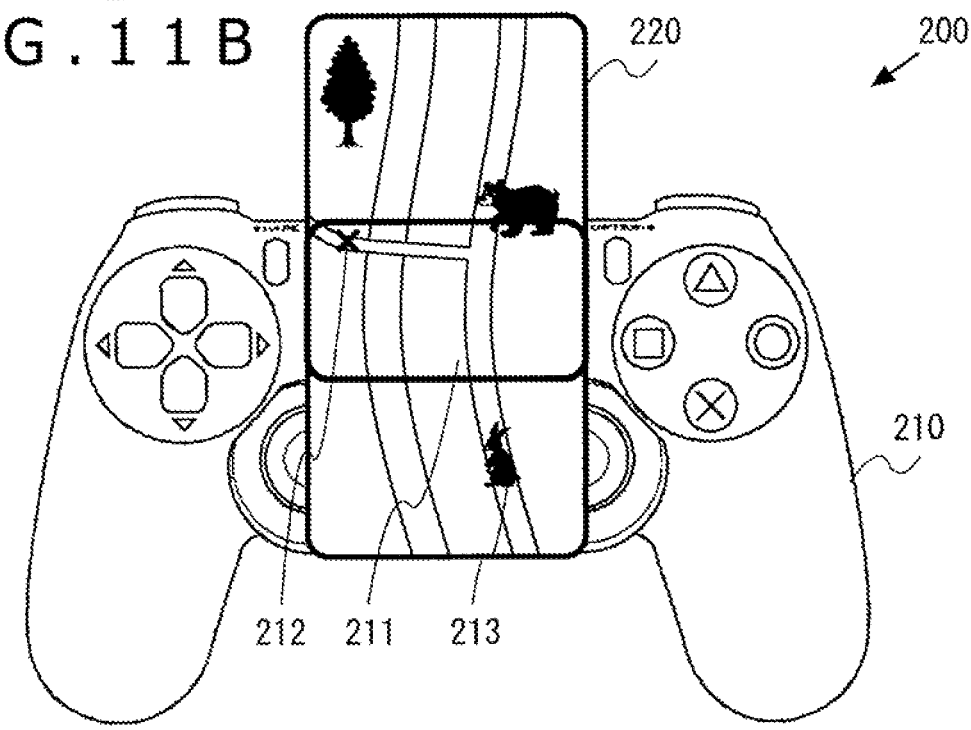

FIGS. 11A and 11B depict other examples of the position selection instruction acceptance screen 200. The region being superimposed on the touch pad 211 in the image 210 of the input apparatus is changed by scrolling the image of the game field in the examples depicted in FIGS. 10A and 10B while, in the examples depicted in FIGS. 11A and 11B, the user changes the display position of the image 210 of the input apparatus by changing the position of the input apparatus 16, and the region of the game field superimposing on the touch pad 211 is set to be changeable. At this time, the display position of the virtual map image 220 may be fixed in advance.

The examples depicted in FIGS. 10A and 10B and the examples depicted in FIGS. 11A and 11B may be combined with each other. In other words, the region of the game field in which its position is selectable may be set to be changeable by each of both of scrolling the game field and moving the input apparatus 16.

FIG. 12 is a flowchart depicting a procedure for a display control method according to the embodiment. When the user depresses the triangular button 75 or the touch pad 79 of the input apparatus 16, the position selecting part 317 displays the image 210 of the input apparatus 16 and the virtual map image 220 including the plurality of selectable viewpoint positions, on the head-mounted display 100 (S100), and accepts the selection instruction for the viewpoint position through the touch pad 79 of the input apparatus 16 (S102). When the user depresses the circle button 72 or the touch pad 79, the position selecting part 317 determines the viewpoint position currently being selected (S104) and notifies the image producing part 316 of this determination. The image producing part 316 produces the image of the virtual space seen from the new viewpoint position, causing the notified viewpoint from the position selecting part 317 to reflect thereon (S106).

In the foregoing description, the present disclosure has been described on the basis of the embodiment. This embodiment is merely illustrative, and it is understood for those skilled in the art that combinations of constituting elements and processes of the embodiment can be modified in various ways and that such modifications are also within the scope of the present invention.

The images for monocular vision are displayed on the display apparatus 190 of the head-mounted display 100 in the above example, while images for binocular stereoscopic view may be displayed in another example.

What is claimed is:

1. A display control apparatus comprising:
an image producing part that produces an image of a virtual space to be displayed on a head-mounted display;
a display control part that causes the head-mounted display to display thereon the image of the virtual space;
a position selecting part that accepts a selection instruction for a position in the virtual space displayed on the head-mounted display, through an input apparatus used by a user, wherein
when the position selecting part accepts the selection instruction for the position from the user, the position selecting part causes the head-mounted display to display thereon an image of the input apparatus, and accepts the selection instruction for the position from a plurality of selectable positions in accordance with an input position relative to a touch pad included in the input apparatus;
an input apparatus information acquiring part that acquires information indicating a position of the input apparatus used by the user,
wherein the position selecting part displays the image of the input apparatus at a position determined on a basis of a relative position of the input apparatus to the head-mounted display in a display screen of the head-mounted display.

2. The display control apparatus according to claim 1, wherein
the position selecting part accepts the selection instruction for a viewpoint position used when the image producing part produces the image of the virtual space, and
the image producing part sets the viewpoint position at a position accepted by the position selecting part, and produces the image of the virtual space.

3. The display control apparatus according to claim 1, wherein
the position selecting part displays a pointer that indicates the input position relative to the touch pad, at a position that corresponds to a touch pad in the image of the input apparatus displayed on the head-mounted display.

4. The display control apparatus according to claim 1, wherein
an image of the virtual space that includes the plurality of selectable positions is displayed, being superimposed on the touch pad or in a vicinity of the touch pad in the image of the input apparatus displayed on the head-mounted display.

5. The display control apparatus according to claim 4, wherein
the image of the virtual space is a planar view image that is acquired by seeing the virtual space from a predetermined direction, or an image that is acquired by setting a predetermined viewpoint position and a predetermined direction of a line of sight and rendering the virtual space.

6. The display control apparatus according to claim 4, wherein
the position selecting part displays a marker that indicates the plurality of selectable positions superimposing the marker on the image of the virtual space.

7. The display control apparatus according to claim 4, wherein
when an image of a region of a portion of the virtual space is displayed, the position selecting part accepts the selection instruction for the position included in the displayed region of the virtual space, and is able to change the displayed region of the virtual space.

8. The display control apparatus according to claim 4, wherein
the position selecting part displays an image of at least a portion of the virtual space and the image of the input apparatus in a superimposed manner, and accepts a selection instruction for a position included in the region of the virtual space displayed being superimposed on the touch pad in the image of the input apparatus.

9. The display control apparatus according to claim 8, wherein
the position selecting part allows the region of the virtual space displayed being superimposed on the touch pad in the image of the input apparatus to be changeable by changing a display position of the image of the input apparatus in accordance with change of the position of the input apparatus.

10. The display control apparatus according to claim 1, wherein
the position selecting part classifies the plurality of selectable positions into a plurality of groups, and accepts a selection instruction for a position from the positions that belong to the group in accordance with an inputting mode onto the touch pad.

11. The display control apparatus according to claim 10, further comprising:
a captured image acquiring part that acquires an image including the input apparatus captured by an imaging apparatus, wherein
the position selecting part refers to a captured image acquired by the captured image acquiring part, and decides an inputting mode onto the touch pad.

12. The display control apparatus according to claim 10, wherein
the touch pad is able to detect change of electrostatic capacitance, and
the position selecting part determines the inputting mode onto the touch pad on a basis of the change of the electrostatic capacitance detected by the touch pad.

13. The display control apparatus according to claim 1, wherein
the position selecting part accepts the selection instruction for the position by a direction key or an analog stick that is included in the input apparatus.

14. A display control method, comprising:

by a display control apparatus, producing an image of a virtual space to be displayed on a head-mounted display;

causing the head-mounted display to display thereon the image of the virtual space; and accepting a selection instruction for a position in the virtual space displayed on the head-mounted display, through an input apparatus used by a user, wherein, when the selection instruction for the position is accepted from the user, the head-mounted display is caused to display thereon an image of the input apparatus, and the selection instruction for the position is accepted from a plurality of selectable positions in accordance with an input position relative to a touch pad included in the input apparatus;

acquiring information indicating a position of the input apparatus used by the user; and displaying the image of the input apparatus at a position determined on a basis of a relative position of the input apparatus to the head-mounted display in a display screen of the head-mounted display.

15. A non-transitory computer readable medium having stored thereon a display control program for a computer, comprising:

an image producing part that produces an image of a virtual space to be displayed on a head-mounted display;

a display control part that causes the head-mounted display to display thereon the image of the virtual space; and a position selecting part that accepts a selection instruction for a position in the virtual space displayed on the head-mounted display, through an input apparatus used by a user, wherein when the position selecting part accepts the selection instruction for the position from the user, the position selecting part causes the head-mounted display to display thereon an image of the input apparatus, and accepts the selection instruction for the position from a plurality of selectable positions in accordance with an input position relative to a touch pad included in the input apparatus;

an input apparatus information acquiring part that acquires information indicating a position of the input apparatus used by the user, wherein the position selecting part displays the image of the input apparatus at a position determined on a basis of a relative position of the input apparatus to the head-mounted display in a display screen of the head-mounted display.

\* \* \* \* \*